United States Patent
Gunda et al.

(10) Patent No.: US 8,442,949 B1
(45) Date of Patent: May 14, 2013

(54) SYSTEMS AND METHODS FOR USING DATA ARCHIVING TO EXPEDITE SERVER MIGRATION

(75) Inventors: Laxmikant V. Gunda, Pune (IN); Praveen Rakshe, Pune (IN)

(73) Assignee: Symantec Corporation, Mountain View, CA (US)

( * ) Notice: Subject to any disclaimer, the term of this patent is extended or adjusted under 35 U.S.C. 154(b) by 534 days.

(21) Appl. No.: 12/724,151

(22) Filed: Mar. 15, 2010

(51) Int. Cl.
*G06F 17/30* (2006.01)
*G06F 12/00* (2006.01)

(52) U.S. Cl.
USPC .......................................... 707/665; 711/161

(58) Field of Classification Search .................. 707/665, 707/640, 674; 711/161
See application file for complete search history.

(56) References Cited

U.S. PATENT DOCUMENTS

| | | | |
|---|---|---|---|
| 2008/0250057 A1* | 10/2008 | Rothstein et al. | 707/102 |
| 2009/0043828 A1* | 2/2009 | Shitomi | 707/204 |
| 2009/0254592 A1* | 10/2009 | Marinov et al. | 707/204 |

* cited by examiner

*Primary Examiner* — Amresh Singh
(74) *Attorney, Agent, or Firm* — ALG Intellectual Property, LLC

(57) ABSTRACT

A computer-implemented method for using data archiving to expedite server migration may include: 1) archiving data from at least one source computing system to an archiving system in accordance with an archiving policy, 2) altering metadata associated with the archived data on the archiving system so that the metadata references a desired target computing system instead of the source computing system, and then, upon bringing the target computing system online, 3) restoring at least a portion of the archived data from the archiving system to the target computing system. Various other methods, systems, and configured computer-readable media are also disclosed.

20 Claims, 6 Drawing Sheets

SYSTEMS AND METHODS FOR USING DATA ARCHIVING TO EXPEDITE SERVER MIGRATION

BACKGROUND

System administrators are often required to migrate or consolidate servers (such as file or email servers) in order to upgrade hardware, perform system maintenance, conserve system resources, increase data-storage capacity, or the like. The amount of time required to consolidate or migrate a server is often directly proportional to the amount of data stored on the server. Unfortunately, due to the large amounts of data commonly stored on modern-day servers, the amount of time required to transfer data from a source server to a target server during a migration or consolidation operation may consume an unacceptable amount of time, potentially resulting in an unacceptable amount of server downtime. As such, the instant disclosure identifies a need for systems and methods for expediting server consolidation and migration operations.

SUMMARY

As will be described in greater detail below, the instant disclosure generally relates to systems and methods for using data archiving to expedite server migration. In one example, one or more of the systems described herein may accomplish such a task by: 1) archiving data from at least one source computing system (such as a file or email server) to an archiving system in accordance with an archiving policy, 2) altering or updating metadata associated with the archived data on the archiving system so that the metadata references a desired target computing system instead of the source computing system, and then, upon bringing the target computing system online, 3) restoring at least a portion of the archived data from the archiving system to the target computing system.

The archiving policy may specify archiving all or merely a portion of the data objects (e.g., files or emails) on the source computing system (such as a fixed percentage of the data objects on the source computing system, data objects that satisfy specific criteria, or the like). This archiving policy may also specify replacing all, a portion, or none of the archived data objects with references (e.g., shortcuts or links) that point to archived instances of the data objects on the archiving system.

In some examples, the systems described herein may prepare the target computing system to be brought online by creating (or recreating) on the target computing system: 1) an identical volume on the target computing system for each volume located on the source computing system and/or 2) references (e.g., shortcuts or links) for each data object on the source computing system that has been archived. As detailed above, these references may point to archived instances of the data objects on the archiving system.

In another example, the systems described herein may prepare the target computing system to be brought online by copying all or a portion of the source computing system's remaining data footprint. For example, a target-preparation module may copy: 1) references to archived instances of data objects on the archiving system from the source computing system to the target computing system and/or 2) non-archived data (i.e., data that has not yet been archived) from the source computing system to the target computing system. After the systems described herein have prepared the target computing system, the target computing system may be brought online and begin servicing requests.

In one example, the systems described herein may restore data from the archiving system to the target computing system after the target computing system has been brought online: 1) on an on-demand basis (i.e., the archiving system may only restore an archived data object to the target computing system upon receiving a request for the same from the target computing system), 2) in the background, and/or 3) in the foreground. The systems described herein may also prioritize restoring (e.g., in the background or foreground) archived data objects from the archiving system to the target computing system based at least in part on one or more properties of the data objects, such as whether the data objects are associated with a particular application or user, when the data objects were last modified or accessed, or any other potentially relevant property or combination of properties.

As will be explained in greater detail below, by archiving data on a source computing system and then restoring the same from an archiving system to a new target computing system (e.g., in the background or on an as-needed basis), the systems and methods described herein may enable system administrators to migrate or consolidate the source computing system to the target computing system without having to fully populate the target computing system with data from the source computing system prior to bringing the target computing system online. As such, these systems and methods may enable system administrators to greatly reduce the amount of server downtime typically required during conventional server migration and consolidation operations.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
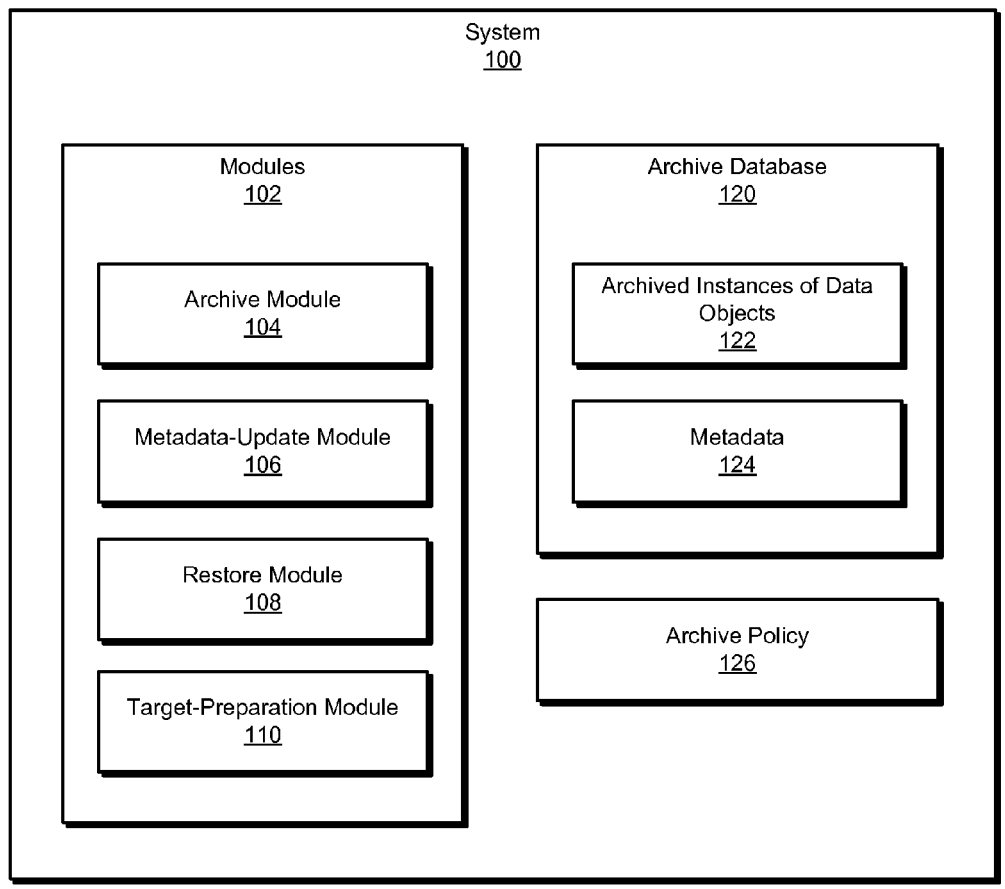
FIG. 1 is a block diagram of an exemplary system for using data archiving to expedite server migration.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for using data archiving to expedite server migration. The phrase "data archiving" (or sometimes simply "archiving"), as used herein, may refer any type or form of system or method for replacing data on a computing system with references to archived instances of the same on a separate storage system. An example of an archiving system is SYMANTEC's ENTERPRISE VAULT.

Figure 2:
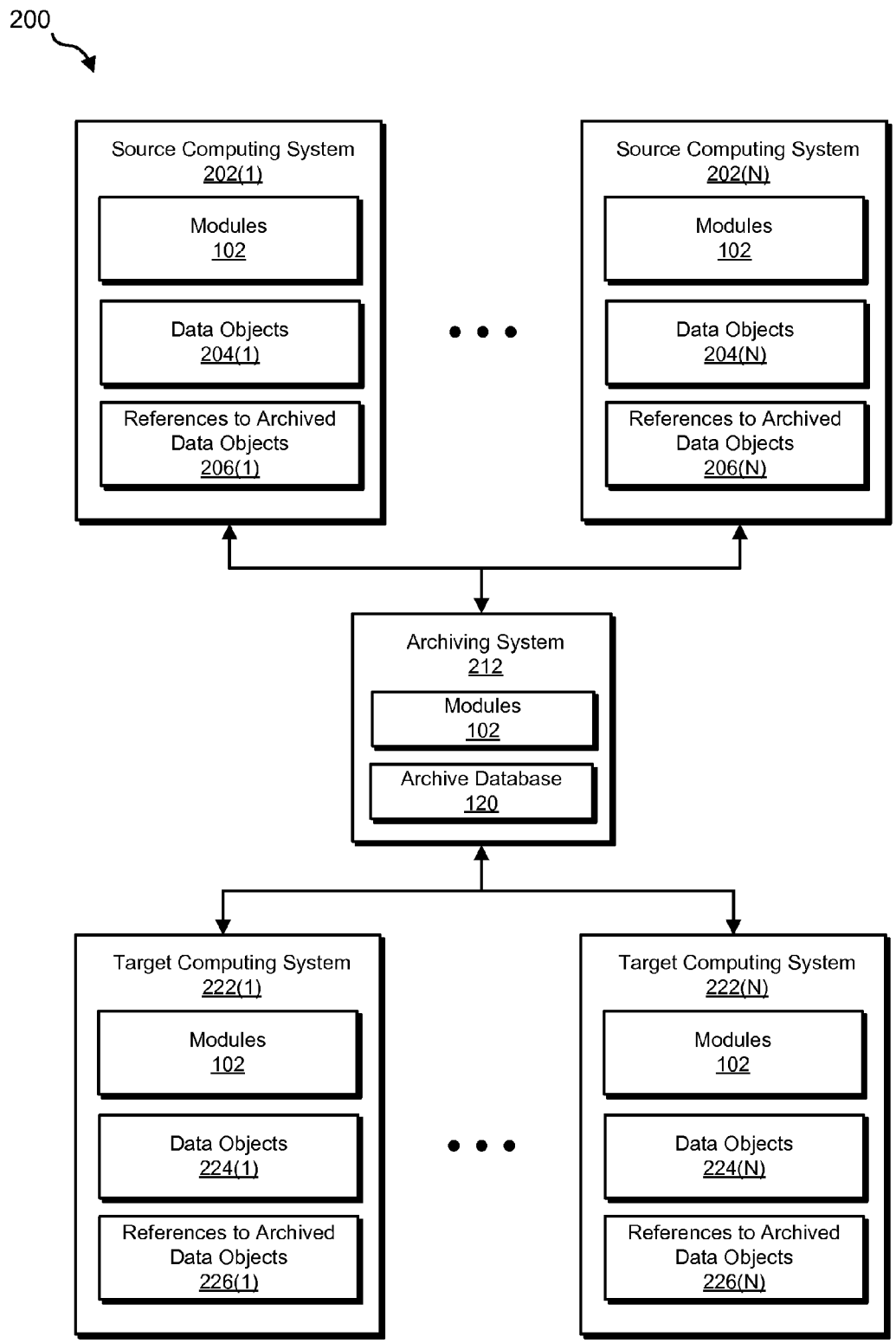
FIG. 2 is a block diagram of an exemplary system for using data archiving to expedite server migration.
Figure 3:
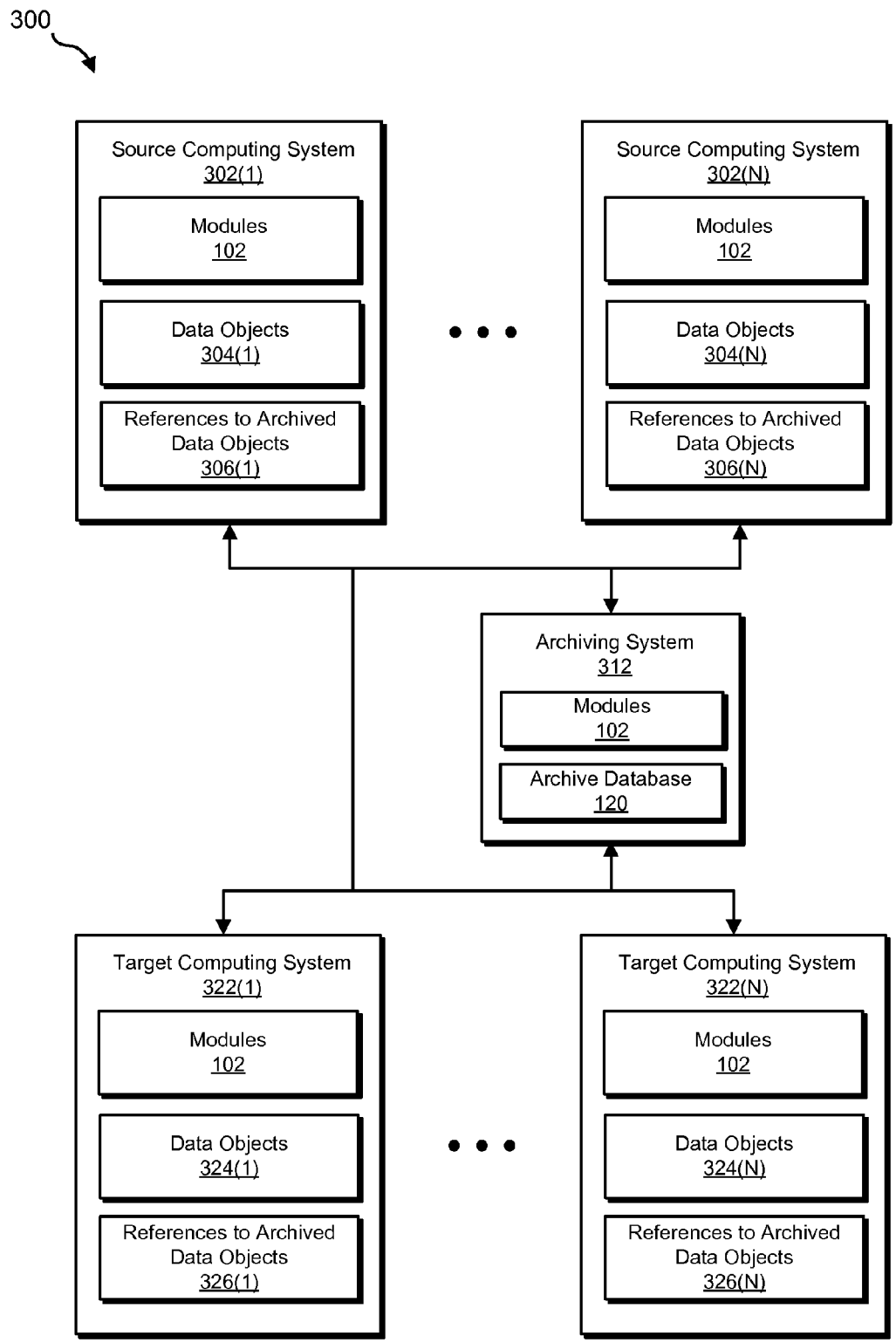
FIG. 3 is a block diagram of an additional exemplary system for using data archiving to expedite server migration.

The following will provide, with reference to FIGS. 1-3, detailed descriptions of exemplary systems for using data archiving to expedite server migration. Detailed descriptions of corresponding computer-implemented methods will also be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for using data archiving to expedite server migration. As illustrated in this figure, exemplary system 100 may include one or more modules 102 for performing one or more tasks. For example, and as will be explained in greater detail below, exemplary system 100 may include an archive module 104 programmed to archive data from a source computing system to an archiving system in accordance with an archiving policy. Exemplary system 100 may also include a metadata-update module 106 programmed to alter or update metadata associated with the archived data on the archiving system so that the metadata references a desired target computing system instead of the source computing system.

In addition, and as will be described in greater detail below, exemplary system 100 may include a restore module 108 programmed to restore at least a portion of the archived data from the archiving system to the target computing system upon bringing the target computing system online. Exemplary system 100 may also include a target-preparation module 110 programmed to prepare and bring a target computing system online. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., source computing systems 202(1)-(N), archiving system 212, and/or target computing systems 222(1)-(N)), the devices illustrated in FIG. 3 (e.g., source computing systems 302(1)-(N), archiving system 312, and/or target computing systems 322(1)-(N)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as archive database 120.

In one example, archive database 120 may include archived instances 122 of data objects and metadata 124 associated with the same. Database 120 may represent portions of a single database or computing device or a plurality of databases or computing devices. For example, database 120 may represent a portion of the devices illustrated in FIG. 2 (e.g., archiving system 212), the devices illustrated in FIG. 3 (e.g., archiving system 312), computing system 510 in FIG. 5, and/or portions of exemplary network architecture 600 in FIG. 6. Alternatively, database 120 in FIG. 1 may represent one or more physically separate devices capable of being accessed by a computing device, such as the devices illustrated in FIG. 2 (e.g., archiving system 212), the devices illustrated in FIG. 3 (e.g., archiving system 312), computing system 510 in FIG. 5, and/or portions of exemplary network architecture 600 in FIG. 6.

In some examples, exemplary system 100 may also include an archive policy 126. As will be explained in greater detail below, archive policy 126 may specify, and/or include criteria for identifying, data to be archived to an archiving system. In some examples, archive policy 126 may be stored on one or more of the devices illustrated in FIG. 2 (e.g., archiving system 212), the devices illustrated in FIG. 3 (e.g., archiving system 312), computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of source computing systems 202(1)-(N) and target computing systems 222(1)-(N) in communication with an archiving system 212. In one embodiment, and as will be described in greater detail below, modules 102 from FIG. 1 may program archiving system 212 to: 1) archive data from at least one source computing system (e.g., one or more of source computing systems 202(1)-(N)) in accordance with an archiving policy (e.g., archive policy 126), 2) alter or update metadata (e.g., metadata 124) associated with the archived data so that the metadata references a desired target computing system (e.g., one or more of target computing systems 222(1)-(N)) instead of the source computing system, and then, upon bringing the target computing system online, 3) restoring at least a portion of the archived data from the archiving system to the target computing system.

Computing systems 202(1)-(N) and 222(1)-(N) generally represent any type or form of computing device that is capable of storing and/or managing data. Examples of computing systems 202(1)-(N) and 222(1)-(N) include, without limitation, application servers (such as MICROSOFT SHAREPOINT servers), file servers, email servers, web servers, or the like.

Archiving system 212 generally represents any type or form of computing device that is capable of archiving data objects (e.g., data objects 204(1)-(N)). For the purposes of this disclosure, the term "data object" may refer to any type or form of data structure. Examples of data objects include all or a portion of a file, all or a portion of an email, all or a portion of an email attachment, and/or or any other type or form of data structure that may be archived.

In one example, archiving system 212 may include archive database 120 from FIG. 1. In some examples, computing systems 202(1)-(N) and 222(1)-(N) may communicate with archiving system 212 via a network, such as, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like.

In some examples, the source and target computing systems described herein may be configured to directly communicate with one another. For example, as illustrated in FIG. 3, source computing systems 302(1)-(N) may be in direct communication with target computing systems 322(1)-(N). As with previous examples, in some embodiments source computing systems 302(1)-(N) may communicate with target computing systems 302(1)-(N) via a network.

Figure 4:
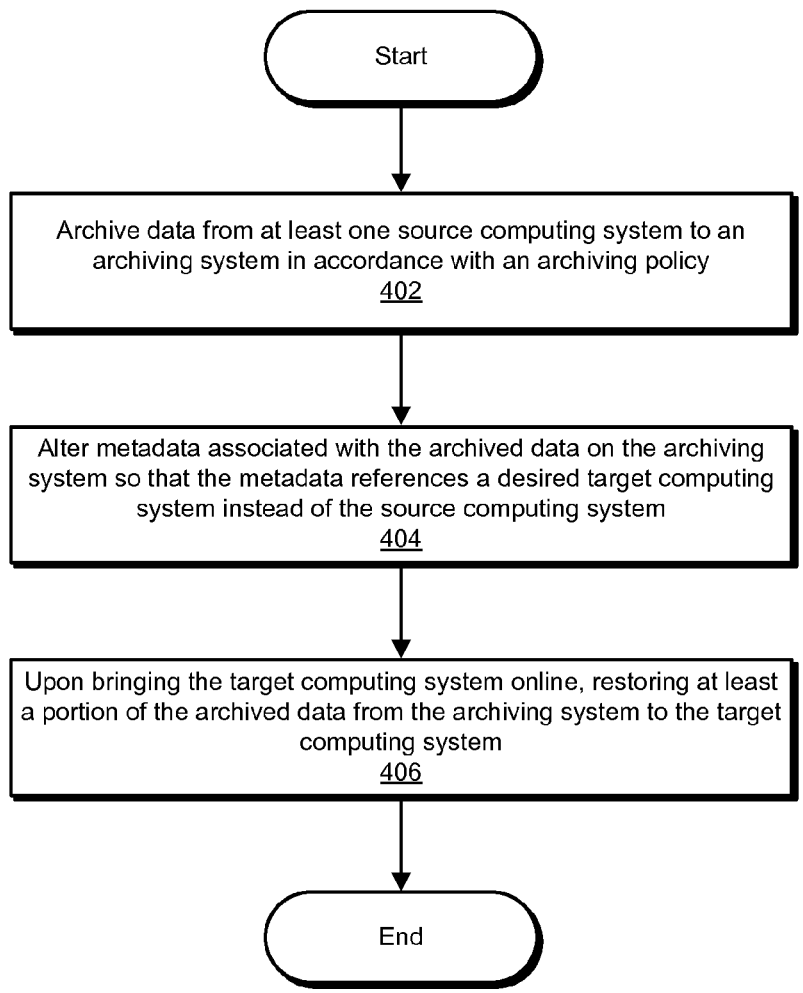
FIG. 4 is a flow diagram of an exemplary method for using data archiving to expedite server migration.

FIG. 4 is a flow diagram of an exemplary computer-implemented method 400 for using data archiving to expedite server migration. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 510 in FIG. 5, and/or portions of exemplary network architecture 600 in FIG. 6.

As illustrated in FIG. 4, at step 402 the systems described herein may archive data from a source computing system to an archiving system in accordance with an archiving policy. For example, archive module 104 in FIG. 1 may, as part of one or more source computing systems 202(1)-(N) and/or archiving system 212 in FIG. 2, archive one or more of data objects 204(1)-(N) to archiving system 212 in accordance with archive policy 126 in FIG. 1.

The systems described herein may perform step 402 in a variety of ways and in a variety of contexts. In one example, archive module 104 may archive data from a plurality of source computing systems to an archiving system. In another example, archive module 104 may archive data from a single source computing system to an archiving system.

As detailed above, archive policy 126 may specify or contain criteria for identifying data that is to be archived by archive module 104. For example, archive policy 126 may specify archiving all data on a source computing system. Alternatively, archive policy 126 may specify archiving a portion of data on a source computing system (such as a fixed percentage of the data objects on the source computing system, data objects that satisfy specific criteria, or the like).

For example, archive module 104 may archive each of data objects 204(1) on source computing system 202(1). In another example, archive module 104 may only archive a portion of data objects 204(N) on source computing system 202(N). In either example, source computing system 202(1) may have previously archived a portion of data objects 204(1) in accordance with a prior, less-aggressive archive policy, such that the amount of time required to archive the remaining data objects 204(1) may be insubstantial.

In one example, archive module 104 may, upon transferring a copy of a data object from a source computing system to an archiving system: 1) remove the data object from the source computing system and then 2) create a reference (e.g., a link or shortcut) on the source computing system that points to an archived instance of the data object on the archiving system. For example, archive module 104 may archive a data object (such as one of data objects 204(1)) on source computing system 202(1)). Upon archiving this data object, archive module 104 may remove (e.g., delete) this data object from source computing system 202(1). In its place, archive module 104 may create a reference or shortcut on source computing system 202(1) that points to an archived instance of the data object within archive database 120 on archiving system 212.

In some examples, archive module 104 may create references or shortcuts for archived data objects in accordance with an archive policy, such as archive policy 126. For example, archive policy 126 may specify replacing all, a portion of, or none of the data objects that archive module 104 archives with a reference or shortcut to an archived instance of the same on the archiving system.

Returning to FIG. 4, at step 404 the systems described herein may alter or update metadata associated with the data archived in step 402 so that the metadata references a desired target computing system instead of the source computing system. For example, metadata-update module 106 in FIG. 1 may, as part of archiving system 212 in FIG. 2, update metadata (such as metadata 124) within archive database 120 that is associated with the archived data received from source computing systems 202(1)-(N) so that this metadata references one or more desired target computing systems (such as target computing systems 222(1)-(N)) instead of source computing systems 202(1)-(N).

The systems described herein may perform step 404 in a variety of ways and in a variety of contacts. In one example, metadata-update module 106 may update metadata associated with archived data received from a single source computing system (e.g., source computing system 202(1)) so that the metadata references a single desired target computing system (e.g., target computing system 222(1)) instead of the source computing system. In another example, metadata-update module 106 may alter metadata associated with archived data received from a plurality of source computing systems (e.g., source computing systems 202(1)-(N)) so that the metadata references a single desired target computing system (e.g., target computing system 222(1)). Metadata-update module 106 may also alter metadata associated with archived data received from a plurality of source computing systems (e.g., source computing systems 202(1)-(N)) so that the metadata references a plurality of desired target computing systems (e.g., target computing systems 222(1)-(N)).

Returning to FIG. 4, at step 406 the systems described herein may, upon bringing the new target computing system online, restore at least a portion of the archived data from the archiving system to the target system. For example, after target computing systems 222(1)-(N) in FIG. 2 have been brought online, restore module 108 in FIG. 1 may, as part of archiving system 222 in FIG. 2, restore at least a portion of the archived data within archive database 120 received from source computing systems 202(1)-(N) to target computing systems 222(1)-(N).

In one example, the systems described herein may prepare and bring a target computing system online prior to restoring archived data to the same in step 406. For example, target-preparation module 110 in FIG. 1 may prepare a target computing system to be brought online by: 1) creating an identical volume on the target computing system for each volume located on the original source computing system (i.e., the source computing system from which the data to be restored has been archived) and/or 2) for each data object archived from the source computing system, creating a reference on the target computing system that points to an archived instance of the data object on the archiving system.

For example, if in step 402 archiving system 212 archived data from source computing system 202(1) in FIG. 2, then target-preparation module 110 in FIG. 1 may prepare target computing system 222(1) to replace source computing system 202(1) by: 1) creating an identical volume on target computing system 222(1) for each volume originally located on source computing system 202(1) and/or, for each data object that has been archived on source computing system 202(1), 2) create a reference on target computing system 222(1) that points to an archived instance of the data object within archive database 120 on archiving system 212.

In one example, target-preparation module 110 may create these volumes and references directly on the target computing system. In other examples, target-preparation module 110 may create these volumes and references on the archiving system and then transfer the same to the target computing system.

In another example, target-preparation module 110 may prepare a target computing system to be brought online by: 1) copying references to archived instances of data objects on the archiving system from an original source computing system to the target computing system and/or 2) copying non-archived data (i.e., data that has yet to be archived) from a source computing system to the target computing system. For example, target-preparation module 110 in FIG. 1 may, as part of source computing system 302(1) and/or target computing system 322(1) in FIG. 3, prepare target computing system 322(1) to replace source computing system 302(1) by copying all or a portion of the data footprint of source computing system 302(1) to target computing system 322(1).

For example, if source computing system 302(1) has archived a majority of data objects 304(1) (replacing, e.g., each archived data object with a reference 306(1) to an archived instance of the data object on archiving system 312), then target-preparation module 110 may copy all remaining non-archived data objects 304(1) and references 306(1) to target computing system 322(1). In this example, because the majority of data objects 304(1) have already been archived and removed from source computing system 302(1), the amount of time required to copy the remaining data footprint of source computing system 302(1) (e.g., the remaining non-archived data objects and references to archived instances of the archived data objects) from source computing system 302(1) to target computing system 322(1) may be substantially reduced.

Target-preparation module 110 may copy references and/or data from a source computing system to a target computing system in a variety of ways. For example, target-preparation module 110 may copy references and/or data from a source computing system to a target computing system using, for example, ROBOCOPY, XCOPY, data-replication techniques, backup/restore techniques, and/or any other data transfer technique.

As detailed above, once the target computing system has been prepared and brought online, restore module 108 may restore at least a portion of the data archived in step 402 from the archiving system to the target computing system. Restore module 108 may restore data from an archiving system to a target computing system in a variety of ways. For example, restore module 108 may restore data from an archiving system to a target computing system: 1) on an on-demand basis, 2) in the background, and/or 3) in the foreground.

For example, restore module 108 may only restore an archived data object from archiving system 212 to target computing system 222(1) in FIG. 2 upon receiving a request for the data object from target computing system 222(1). In this example, target computing system 222(1) may generate such a request upon receiving a corresponding request from a user or application to access the data object in question. As such, while the requesting user or application may experience a slight delay when first accessing a data object, this approach may allow restore module 108 to populate target computing system 222(1) with data objects on an as-needed basis.

As detailed above, restore module may also restore archived data from an archiving system to a target computing system using a background process (e.g., when the target computing system is idle) and/or a foreground process. In some examples, restore module 108 may prioritize the restoration of data objects from an archiving system to a target computing system based at least in part on properties associated with the data objects. For example, restore module 108 may prioritize restoring (e.g., in the background or foreground) archived data objects from archiving system 212 to target computing system 222(1) based on whether the data objects are associated with a particular application or user, when the data objects were last modified or accessed, or any other potentially relevant property or combination of properties. Upon completion of step 406, exemplary method 400 in FIG. 4 may terminate.

The following with provide, with reference to FIG. 2 and for the purposes of illustration only, an example of migrating or consolidating a source computing system to a target computing system using data archiving in accordance with method 400 in FIG. 4. In this example, at step 402 archive module 104 in FIG. 1 may apply an aggressive archive policy to source computing system 202(1) in FIG. 2. This archive policy may specify archiving all data (e.g., each of data objects 204(1)) on source computing system 202(1) without replacing these data objects with references (e.g., shortcuts) that point to archived instances of the same on archiving system 212 (i.e., the policy may specify that any data objects on the source computing system that have not been previously archived are to be archived but not removed from the source computing system). In this example, source computing system 202(1) may have previously archived a portion of data objects 204(1) in accordance with a prior, less-aggressive archive policy, such that the amount of time required to archive the remaining data objects 204(1) may be insubstantial. This prior archiving policy may also have specified replacing these previously archived data objects with references 206(1) that point to archived instances of the same on archiving system 212.

Once all data on source computing system 202(1) has been archived in accordance with the archive policy, metadata-update module 106 in FIG. 1 may update all metadata (such as metadata 124) within archive database 120 that is associated with the archived data received from source computing system 202(1) in FIG. 2 so that this metadata references target computing system 222(1) instead of source computing system 202(1).

Upon completion of step 404, target-preparation module 110 in FIG. 1 may prepare target computing system 222(1) in FIG. 2 to replace source computing system 202(1) by: 1) creating an identical volume on target computing system 222(1) for each volume originally located on source computing system 202(1) and, for each of data objects 204(1) on source computing system 202(1), 2) creating a reference on target computing system 222(1) that points to an archived instance of the data object within archive database 120 on archiving system 212. In some examples, the amount of time required to complete this creation (or recreation) process may be insubstantial due to the small amounts of data (in some cases, none) that must be transferred from archiving system 212 to target computing system 222(1).

After target preparation module 110 has recreated each reference and volume originally located on source computing system 202(1) on target computing system 222(1), target computing system 222(1) may be brought online and begin servicing requests. At step 406, restore module 108 in FIG. 1 may then begin restoring at least a portion of the archived data within archive database 120 received from source computing system 202(1) to target computing system 222(1). For example, restore module 108 may restore data from archiving system 216 to target computing system 222(1) on an on-demand basis, in the background, and/or in the foreground. Restore module 108 may also prioritize the restoration of data to target computing system 222(1) based on one or more properties associated with each archived data object, as detailed above.

In an additional example of method 400 in FIG. 4, at step 402 archive module 104 in FIG. 1 may apply an archive policy to source computing system 302(1) in FIG. 3 that specifies archiving only a portion of the data objects on source computing system 302(1) (such as a fixed percentage of the data objects on the source computing system, data objects that satisfy specific criteria, or the like). In this example, this archive policy may specify replacing each archived data object with a reference (e.g., shortcut) that points to an archived instance of the same on archiving system 312. As with the prior example, source computing system 302(1) may have previously archived a portion of data objects 304(1) in accordance with a prior archive policy, such that the amount of time required to archive the remaining data objects 304(1) may be insubstantial. This prior archiving policy may also have specified replacing these previously archived data objects with references 306(1) that point to archived instances of the same on archiving system 312.

Once the selected data objects have been archived in accordance with the archive policy, at step 404 metadata-update module 106 in FIG. 1 may update all metadata (such as metadata 124) within archive database 120 that is associated with the archived data received from source computing system 302 in FIG. 3 so that this metadata references target computing system 322(1) instead of source computing system 302(1).

Upon completion of step 404, target-preparation module 110 in FIG. 1 may prepare target computing system 322(1) in FIG. 3 to replace source computing system 302(1) by copying the entire remaining data footprint of source computing system 302(1) directly from source computing system 302(1) to target computing system 322(1). For example, target-preparation module 110 may copy all remaining data objects 304(1) and references 306(1) directly from source computing system 302(1) to target computing system 322(1). In this example, because the majority of data objects 304(1) have already been archived and removed from source computing system 302(1), the amount of time required to copy the remaining data footprint of source computing system 302(1) from source computing system 302(1) to target computing system 322(1) may be substantially reduced.

After target preparation module 110 has prepared target computing system 322(1), target computing system 322(1) may be brought online and begin servicing requests. At step 406, restore module 108 in FIG. 1 may then begin restoring at least a portion of the archived data within archive database 120 received from source computing system 302(1) to target computing system 322(1). For example, restore module 108 may restore data from archiving system 316 to target computing system 322(1) on an on-demand basis, in the background, and/or in the foreground. Restore module 108 may also prioritize the restoration of data to target computing system 322(1) based on one or more properties associated with each archived data object, as detailed above.

As detailed above, by archiving data on a source computing system and then restoring the same from an archiving system to a new target computing system (e.g., in the background or on an as-needed basis), the systems and methods described herein may enable system administrators to migrate or consolidate the source computing system to the target computing system without having to fully populate the target computing system with data from the source computing system prior to bringing the target computing system online. As such, these systems and methods may enable system administrators to greatly reduce the amount of server downtime typically required during conventional server migration and consolidation operations.

Figure 5:
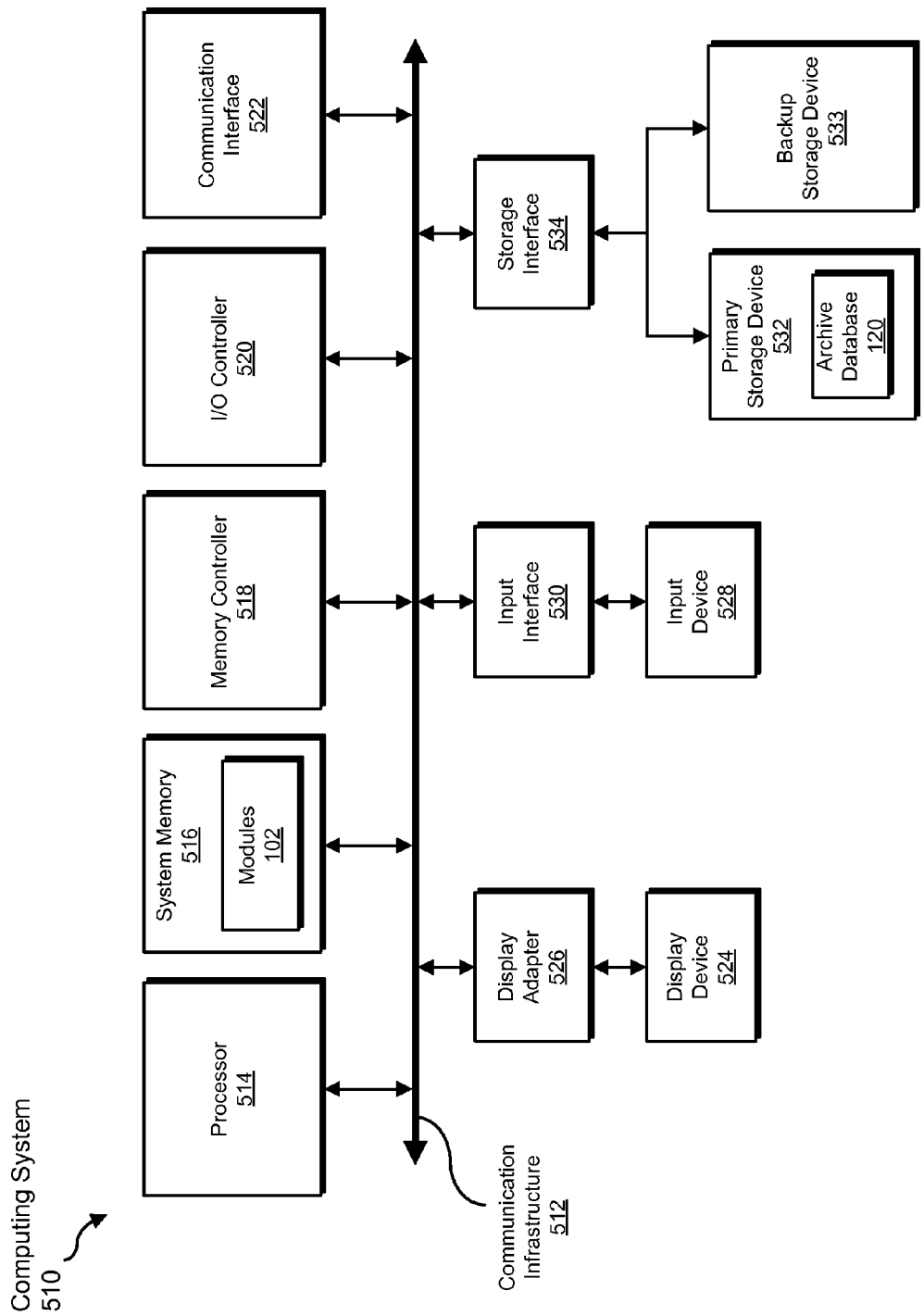
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the archiving, altering, updating, bringing online, taking offline, restoring, migrating, consolidating, removing, creating, referencing, copying, and prioritizing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as archiving, altering, updating, bringing online, taking offline, restoring, migrating, consolidating, removing, creating, referencing, copying, and prioritizing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the archiving, altering, updating, bringing online, taking offline, restoring, migrating, consolidating, removing, creating, referencing, copying, and prioritizing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the archiving, altering, updating, bringing online, taking offline, restoring, migrating, consolidating, removing, creating, referencing, copying, and prioritizing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the archiving, altering, updating, bringing online, taking offline, restoring, migrating, consolidating, removing, creating, referencing, copying, and prioritizing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, archive database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the archiving, altering, updating, bringing online, taking offline, restoring, migrating, consolidating, removing, creating, referencing, copying, and prioritizing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
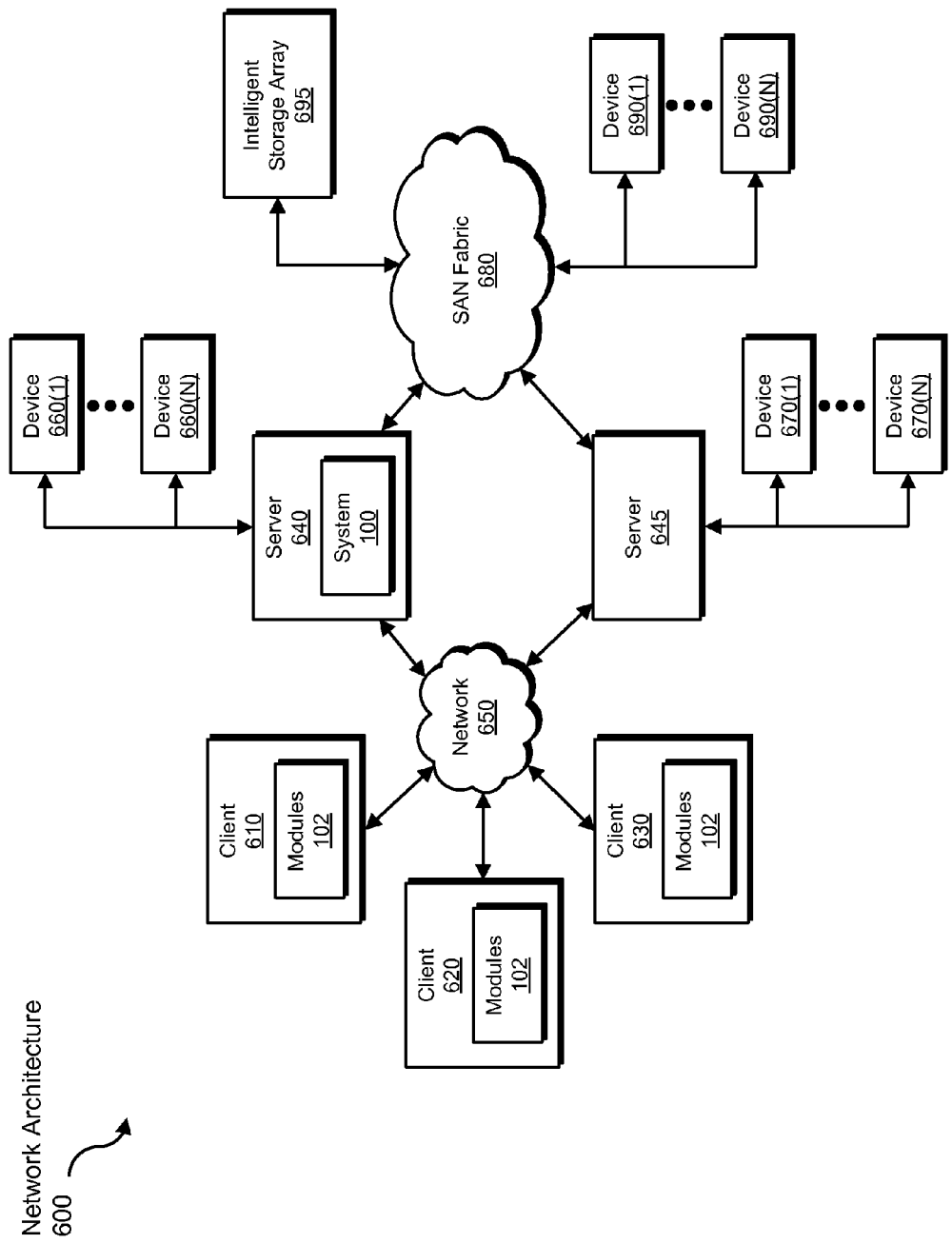
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include portions of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the archiving, altering, updating, bringing online, taking offline, restoring, migrating, consolidating, removing, creating, referencing, copying, and prioritizing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for using data archiving to expedite server migration. In one example, such a method may include: 1) archiving data from at least one source computing system to an archiving system in accordance with an archiving policy, 2) altering metadata associated with the archived data on the archiving system so that the metadata references a desired target computing system instead of the source computing system, and then, upon bringing the target computing system online, 3) restoring at least a portion of the archived data from the archiving system to the target computing system.

In some examples, archiving data from the source computing system to the archiving system in accordance with the archiving policy may include archiving all or a portion of the data objects on the source computing system. Archiving data from the source computing system to the archiving system in accordance with the archiving policy may also include, for each data object on the source computing system that is archived to the archiving system: 1) removing the data object from the source computing system and then 2) creating a reference on the source computing system that points to an archived instance of the data object on the archiving system.

In some examples, the method may also include, prior to bringing the target computing system online: 1) creating an identical volume on the target computing system for each volume located on the source computing system and/or 2) for each data object within the archived data, creating a reference on the target computing system that points to an archived instance of the data object on the archiving system. The method may also include, prior to bringing the target computing system online, copying: 1) references to archived instances of data objects on the archiving system from the source computing system to the target computing system and/or 2) non-archived data from the source computing system to the target computing system.

In one example, restoring at least a portion of the archived data from the archiving system to the target computing system may include: 1) for each data object within the archived data, restoring the data object in response to a request from the target computing system, 2) restoring the archived data using a background process, and/or 3) restoring the archived data using a foreground process. Restoring at least a portion of the archived data from the archiving system to the target computing system may also include, for each data object within the archived data, prioritizing restoration of the data object based on at least one property of the data object. Examples of data-object properties include, without limitation, an application associated with the data object, a user associated with the data object, a last-modified date associated with the data object, and a last-accessed date associated with the data object.

In some examples, the method may also include taking the source computing system offline upon bringing the target computing system online. Examples of the source computing system include, without limitation, a file server, an email server, an application server, and a web server.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or of the modules described herein may transform a property or characteristic of a target computing system by restoring archived data from an archiving system to the target computing system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using data archiving to expedite server migration, at least a portion of the method being performed by a computing system comprising at least one processor, the method comprising:
    archiving data from at least one source computing system to an archiving system in accordance with an archiving policy;
    altering metadata associated with the archived data on the archiving system so that the metadata references a desired target computing system that is currently offline instead of the source computing system;
    preparing the target computing system to be brought online based at least in part on the altered metadata by copying at least one reference to at least a portion of the archived data on the archiving system to the target computing system in order to enable restoration of the portion of the archived data to the target computing system;
    upon bringing the target computing system online, restoring the portion of the archived data from the archiving system to the target computing system by using the reference copied to the target computing system to access the portion of the archived data.

2. The method of claim 1, wherein archiving data from the source computing system to the archiving system in accordance with the archiving policy comprises at least one of:
    archiving all data objects on the source computing system;
    archiving a portion of data objects on the source computing system.

3. The method of claim 1, wherein archiving data from the source computing system to the archiving system in accordance with the archiving policy comprises, for each data object on the source computing system that is archived to the archiving system:

removing the data object from the source computing system;

creating a reference on the source computing system that points to an archived instance of the data object on the archiving system.

4. The method of claim 1, wherein preparing the target computing system to be brought online comprises at least one of:

creating an identical volume on the target computing system for each volume located on the source computing system;

for each data object within the archived data, creating a reference on the target computing system that points to an archived instance of the data object on the archiving system.

5. The method of claim 1, wherein preparing the target computing system to be brought online comprises at least one of:

copying references to archived instances of data objects on the archiving system from the source computing system to the target computing system;

copying non-archived data from the source computing system to the target computing system.

6. The method of claim 1, wherein restoring the portion of the archived data from the archiving system to the target computing system comprises at least one of:

for each data object within the archived data, restoring the data object in response to a request from the target computing system;

restoring the archived data using a background process;

restoring the archived data using a foreground process.

7. The method of claim 1, wherein restoring the portion of the archived data from the archiving system to the target computing system comprises, for each data object within the archived data, prioritizing restoration of the data object based on at least one property of the data object.

8. The method of claim 7, wherein the property comprises at least one of:

an application associated with the data object;

a user associated with the data object;

a last-modified date associated with the data object;

a last-accessed date associated with the data object.

9. The method of claim 1, further comprising taking the source computing system offline upon bringing the target computing system online.

10. The method of claim 1, wherein the source computing system comprises at least one of:

a file server;

an email server;

an application server;

a web server.

11. A system for using data archiving to expedite server migration, the system comprising:

an archive module programmed to archive data from a source computing system to an archiving system in accordance with an archiving policy;

a metadata-update module programmed to alter metadata associated with the archived data on the archiving system so that the metadata references a desired target computing system that is currently offline instead of the source computing system;

a target-preparation module programmed to prepare the target computing system to be brought online based at least in part on the altered metadata by copying at least one reference to at least a portion of the archived data on the archiving system to the target computing system in order to enable restoration of the portion of the archived data to the target computing system;

a restore module programmed to restore the portion of the archived data from the archiving system to the target computing system by using the reference copied to the target computing system to access the portion of the archived data upon bringing the target computing system online;

at least one processor configured to execute the archive module, the metadata-update module, the target-preparation module, and the restore module.

12. The system of claim 11, wherein the archive module archives data from the source computing system to the archiving system in accordance with the archiving policy by at least one of:

archiving all data objects on the source computing system;

archiving a portion of data objects on the source computing system.

13. The system of claim 11, wherein the archive module archives data from the source computing system to the archiving system in accordance with the archiving policy by, for each data object on the source computing system that is archived to the archiving system:

removing the data object from the source computing system;

creating a reference on the source computing system that points to an archived instance of the data object on the archiving system.

14. The system of claim 11, wherein the target-preparation module is programmed to at least one of:

create an identical volume on the target computing system for each volume located on the source computing system;

for each data object within the archived data, create a reference on the target computing system that points to an archived instance of the data object on the archiving system.

15. The system of claim 11, wherein the target-preparation module is programmed to at least one of:

copy references to archived instances of data objects on the archiving system from the source computing system to the target computing system;

copy non-archived data from the source computing system to the target computing system.

16. The system of claim 11, wherein the restore module restores the portion of the archived data from the archiving system to the target computing system by at least one of:

for each data object within the archived data, restoring the data object in response to a request from the target computing system;

restoring the archived data using a background process;

restoring the archived data using a foreground process.

17. The system of claim 11, wherein the restore module restores the portion of the archived data from the archiving system to the target computing system by, for each data object within the archived data, prioritizing restoration of the data object based on at least one property of the data object.

18. The system of claim 17, wherein the property comprises at least one of:

an application associated with the data object;

a user associated with the data object;

a last-modified date associated with the data object;

a last-accessed date associated with the data object.

19. The system of claim 11, wherein the source computing system comprises at least one of:

a file server;
an email server;
an application server;
a web server.

20. A non-transitory computer-readable-storage medium comprising computer-executable instructions that, when executed by at least one processor of a computing device, cause the computing device to:
- archive data from a source computing system to an archiving system in accordance with an archiving policy;
- alter metadata associated with the archived data on the archiving system so that the metadata references a desired target computing system that is currently offline instead of the source computing system;
- preparing the target computing system to be brought online based at least in part on the altered metadata by copying at least one reference to at least a portion of the archived data on the archiving system to the target computing system in order to enable restoration of the portion of the archived data to the target computing system;
- upon bringing the target computing system online, restore the portion of the archived data from the archiving system to the target computing system by using the reference copied to the target computing system to access the portion of the archived data.

* * * * *